Patented Nov. 15, 1932

1,888,002

UNITED STATES PATENT OFFICE

ADOLF KREBSER, OF BASEL, SWITZERLAND, ASSIGNOR TO THE FIRM J. R. GEIGY S. A., OF BASEL, SWITZERLAND

MANUFACTURE OF AZOPHTHALEIN DYESTUFFS

No Drawing. Application filed May 17, 1929, Serial No. 364,002, and in Germany May 24, 1928.

By condensing alkylated amino-hydroxy-benzoyl-benzoic acids with resorcinol or derivaties thereof, such as sulphonic acids or carboxylic acids of resorcinol, phthalein dyestuffs have been made which in general dye red tints in part with aid of a mordant.

This invention relates to the manufacture of new dyestuffs of this series also containing the resorcinol residue by condensing an amino-hydroxy benzoyl-benzoic acid alkylated or arylated at the nitrogen, in equimolecular proportions with an azo-dyestuff which contains resorcinol or a derivative thereof, such that there is still a free para-position relative to one of the hydroxyl-groups thereof.

In the lactone form these dyestuffs may be supposed to have the general formula

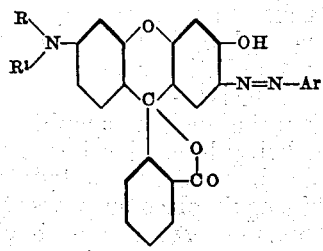

in which R=alkyl, R¹=alkyl or H and Ar=any aromatic residue.

While the condensation products from simple resorcinol monoazo-dyestuffs are of themselves of little value as dyestuffs, they find technical application as intermediate products. On the other hand, the azophthaleins obtained by means of azo-dyestuffs from resorcinol and ortho-hydroxy-amino-compounds exhibit surprising new effects. These dyestuffs are genuine mordant dyestuffs which, when after-treated on the fibre with metal salts, yield fast valuable dyeings and, indeed, what is not to be expected, these are of blue to greenish-blue tints. Other mordant dyeing groups may be contained in the resorcinol monoazo-dyestuffs, such as carboxyl groups or one or more carboxyl groups with a hydroxyl group in ortho-position. In the latter case the after-chromed dyeings are of reddish to brown-red tints.

The condensation process may consist in heating the components with sulphuric acid 66° Bé. or with strongly concentrated sulphuric acid for some hours.

The following examples illustrate the invention:—

Example 1

5,8 kilos of dimethylamino-hydroxybenzoylbenzoic acid and 6,5 kilos of the monoazo-dyestuff from 6-methyl-2-aminophenol-4-sulphonic acid and resorcinol are mixed together and introduced into 50 kilos of concentrated sulphuric acid at 20–30° C. The whole is heated to 70° C. and kept at this temperature for 20 hours. The reaction takes place according to the following formula:

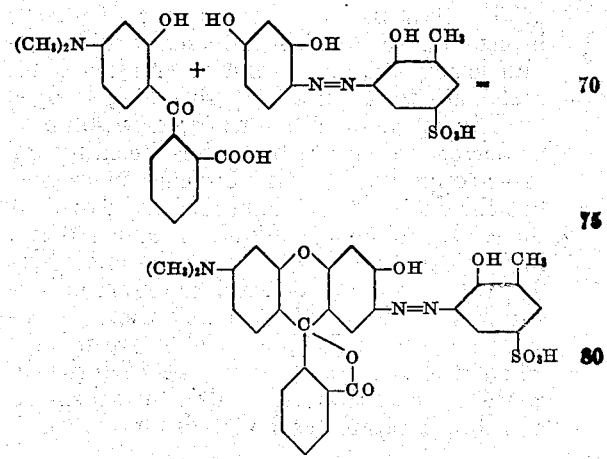

For working up the product the mass is poured into water, filtered, and the dyestuff acid is washed neutral and dried. It is a powder of bronze lustre which dissolves in concentrated sulphuric acid to a yellowish-red solution and in sodium carbonate to a violet solution. The dyestuff which has been converted into the sodium salt in the known manner dyes wool in an acid bath reddish-blue which, when after-chromed, becomes a beautiful blue of good properties of fastness. By using in the condensation the monoazo-dyestuff from 4-chloro-2-aminophenol-6-sulphonic acid and resorcinol a like dyestuff is produced with similar advantageous properties.

*Example 2*

6,3 parts of diethylaminohydroxybenzoyl-benzoic acid and 7,8 kilos of the monoazo-dyestuff from 1:2:4-aminonaphtholsulphonic acid and resorcinol are mixed together and introduced at 20–30° C. into 70 kilos of concentrated sulphuric acid. The whole is heated to 70° C. and kept at this temperature for 4–5 hours. The reaction takes place according to the following formula:

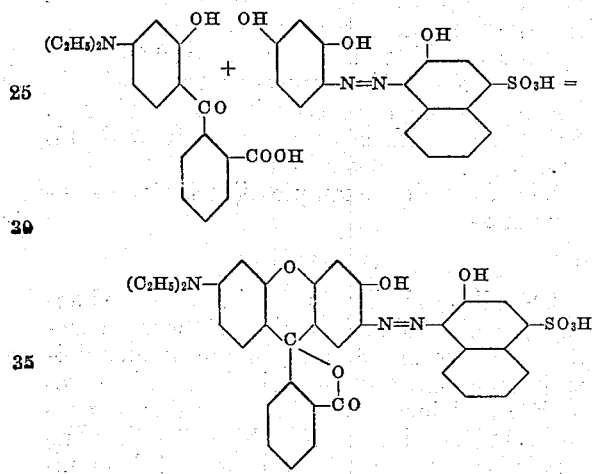

The mass is then worked up as described in Example 1.

The dyestuff is a blue powder of strong bronze lustre, soluble in concentrated sulphuric acid to a green solution and in sodium carbonate to a pure blue solution; it dyes wool in an acid bath pure greenish-blue of moderate fastness; by after-chroming or after-coppering the tint becomes more dull but the fastness is enhanced. If instead of the resorcinolmonoazo-dyestuff named above, in this example there is used the analogous dyestuff from nitro-1:2:4 aminonaphtholsulphonic acid and resorcinol, there is obtained a dyestuff which yields green tints when after chromed on wool. Its solution in concentrated sulphuric acid is brownish-red and that in sodium carbonate is blue-green.

*Example 3*

5,8 kilos of dimethylamino-hydroxybenzoyl-benzoic acid are condensed with 5,2 kilos of the monoazo-dyestuff from anthranilic acid and resorcinol by heating with 50 kilos of concentrated sulphuric acid at 70° C. for 24 hours. The product is worked up as described in Example 1, whereby there are obtained 10 kilos of the azo-phthalein dyestuff. The reaction takes place according to the following formula:

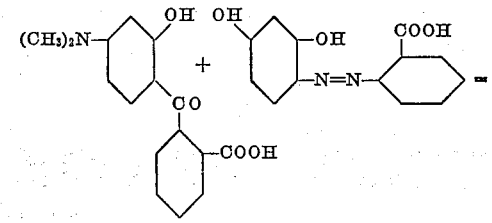

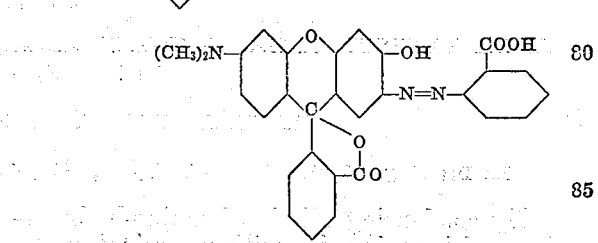

It dissolves in concentrated sulphuric acid to a brown-red solution, in sodium carbonate to a red solution. When after-chromed on wool it yields beautiful brown-red tints.

The condensation products from benzoyl-benzoic acids and the monoazo-dyestuffs from resorcinol and derivatives thereof with aniline and its sulphonic acids, such as sulphanilic acid, amino salicyclic acid, chloranilinesulphonic acid or with naphthylamine or its sulphonic acids, such as 1:5- or 2:6-naphthylaminesulphonic acid, are orange, brown to red dyestuffs.

They are of little interest from the point of view of the dyer but find use as intermediate products for making dyestuffs.

In these examples, instead of resorcin, there can also be used cresorcin (1-methyl-2:4-dioxybenzene) and other resorcinol derivatives.

What I claim is:—

1. A manufacture of azophthalein dyestuffs, consisting in condensing an aminohydroxybenzoylbenzoic acid, alkylated at the nitrogen, in equimolecular proportions with a resorcinolic monoazo-dyestuff having a free para-position to one of the hydroxyl groups of the resorcinol radical.

2. A manufacture of azophthalein dyestuffs, consisting in condensing a dialkylaminohydroxybenzoylbenzoic acid in equimolecular proportions with a monoazodyestuff from resorcinol having a free para-position to one of the hydroxyl groups of the resorcinol radical.

3. A manufacture of azophthalein dyestuffs, consisting in condensing a diethylaminohydroxybenzoylbenzoic acid in equimolecular proportions with a monoazo-dyestuff from resorcinol having a free para-position to one of the hydroxyl groups of the resorcinol radical.

4. As new products of manufacture, the hereinbefore described azophthalein dyestuffs having in the lactone form probably the following formula:

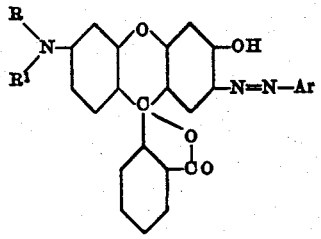

wherein R=alkyl, R$^1$=alkyl or hydrogen and Ar=any aromatic radical, said dyestuffs constituting powders of bronze lustre dissolving in concentrated sulphuric acid with yellowish-red to green coloration and in sodium carbonate to a blue to violet solution and yielding on wool in acid bath blue to greenish blue tints showing, when after-chromed, an enhanced fastness.

In witness whereof I have hereunto signed my name this 4th day of May, 1929.

ADOLF KREBSER.